Sept. 21, 1943.  J. H. STALEY  2,329,860
ENGINE INSPECTION STAND
Filed Dec. 31, 1941  3 Sheets-Sheet 1

INVENTOR,
JOSEPH H. STALEY
By Minturn & Minturn,
ATTORNEYS.

Sept. 21, 1943.  J. H. STALEY  2,329,860
ENGINE INSPECTION STAND
Filed Dec. 31, 1941  3 Sheets-Sheet 3

INVENTOR,
JOSEPH H. STALEY,
By Minturn & Minturn
ATTORNEYS.

Patented Sept. 21, 1943

2,329,860

UNITED STATES PATENT OFFICE 2,329,860

ENGINE INSPECTION STAND

Joseph H. Staley, Columbus, Ind.

Application December 31, 1941, Serial No. 425,072

1 Claim. (Cl. 29—89)

This invention relates to engine stands for rockably supporting radial engines of the type now being used in United States Army tanks, and particularly to those types of radial engines equipped with steady bars. One of the uses of the stands embodying the present invention is to receive and support an engine for inspection purposes, although the invention is not to be limited to that use alone.

In practice, the radial engine is removed from a tank at the end of one hundred hours' use, and a careful inspection is then made of the engine before it is put back into service again. The present invention is designed to support the radial engine in the same relative position as it is mounted in the tank, and further, to permit revolution of the engine to give access to the various members of the engine, and particularly to permit removal and inspection of the push rods of the horizontally disposed cylinders.

The stand embodying the present invention is extremely simple in construction and provides primarily a base, from the ends of which base extend vertically upwardly supports that detachably receive in a rockable manner an arm bracket that has been previously attached to the engine before the engine is placed in the stand. There are no beams or members of the stand interconnecting the supports above the base. The supports themselves are reduced to a very simple skeleton structure having a minimum width at their top ends so as to give the maximum possible access to the engine in the stand from the ends of the stand.

Figure 2:
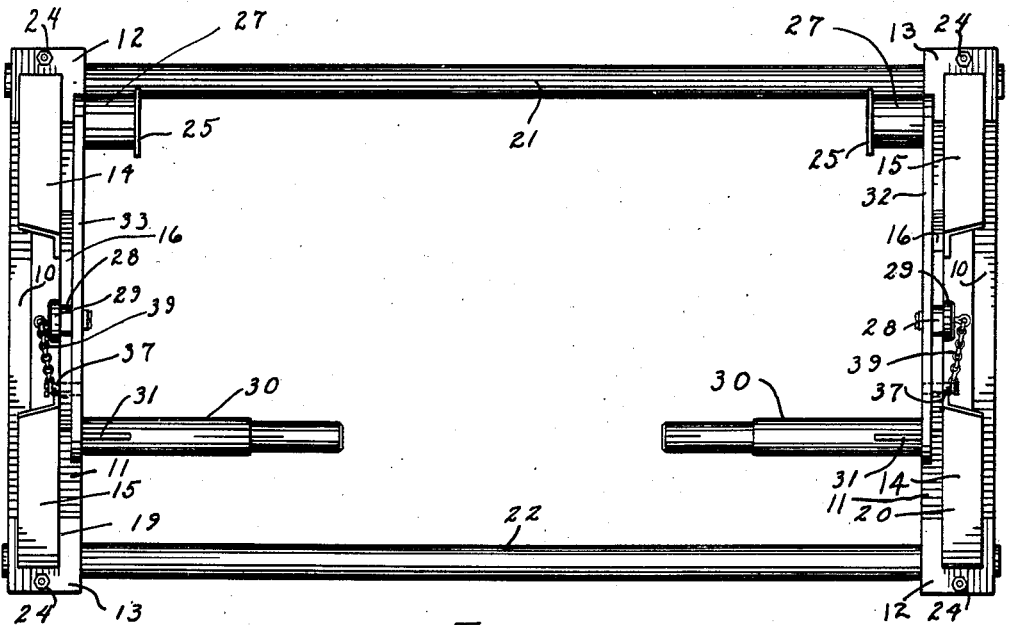
Figure 1:
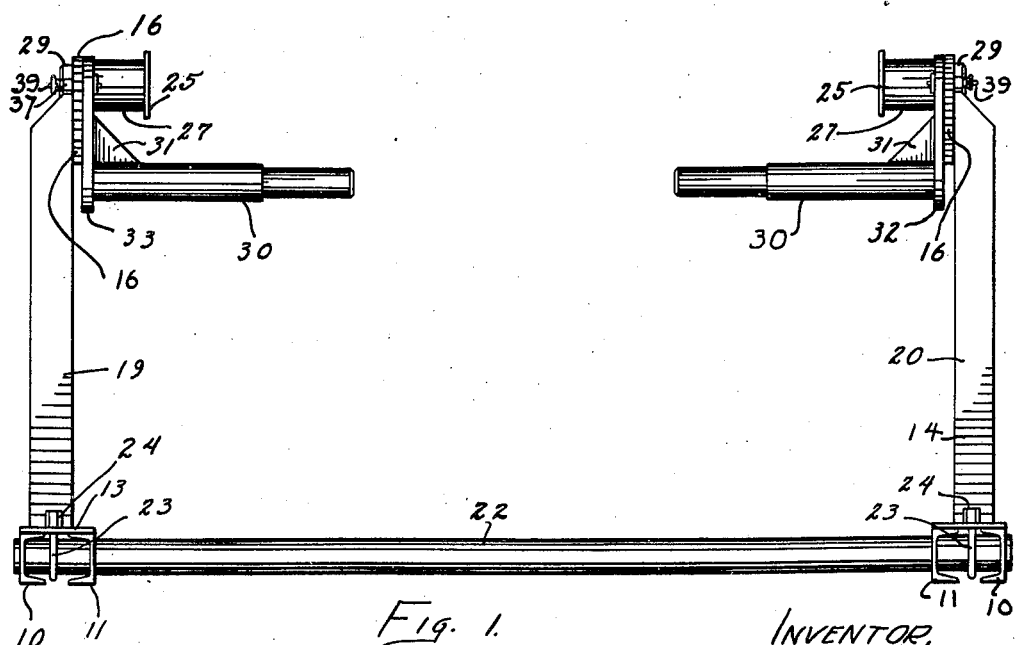
Figure 3:
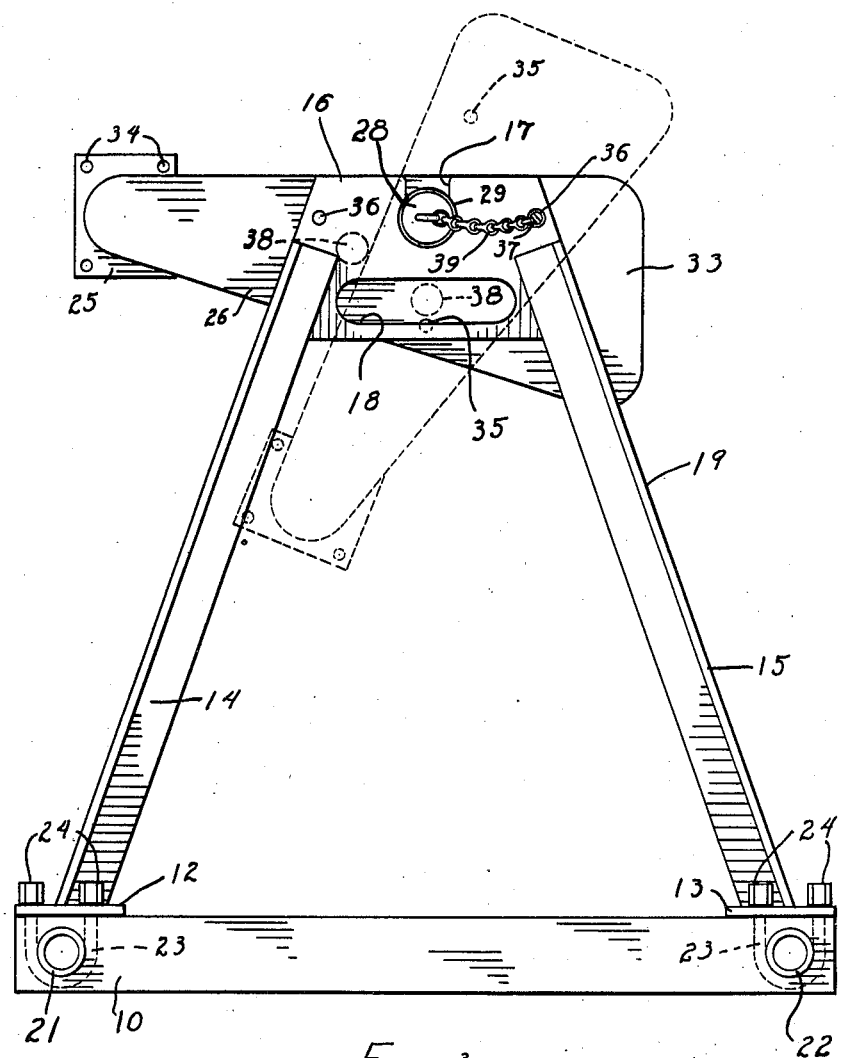
Figure 4:
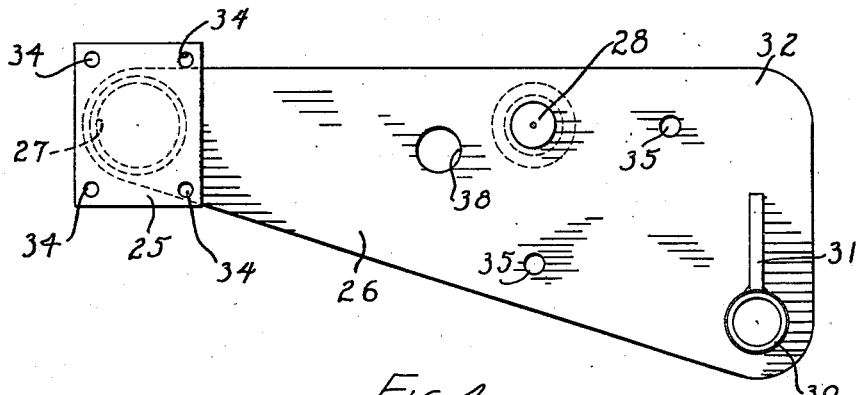
Figure 5:
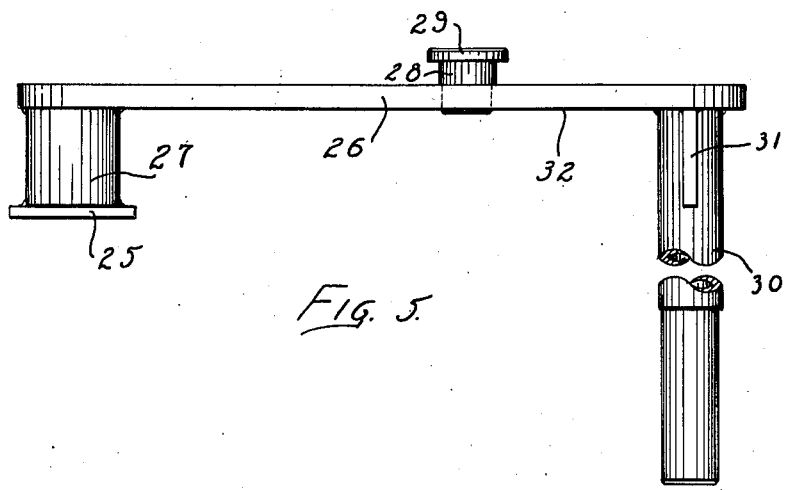

Other important objects and advantages of the invention will become apparent to those versed in the art in the following description of one particular form of the invention as illustrated in the accompanying drawings, in which Fig. 1 is a view in side elevation of a structure embodying the invention;

Fig. 2, a view in top plan;

Fig. 3, a view in end elevation;

Fig. 4, a view in elevation from the inside face of an arm bracket assembly;

Fig. 5, a top plan view of the arm bracket assembly; and

Figure 6:
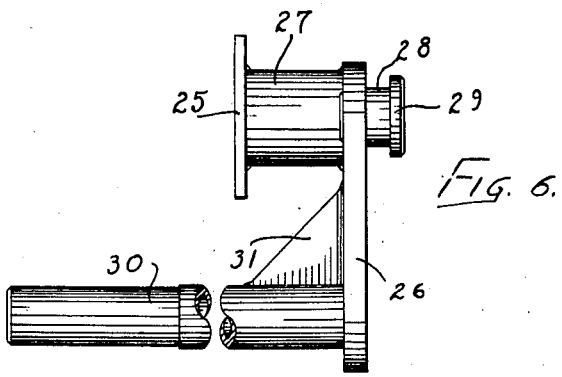

Fig. 6, a view in elevation from the steady bar end of the assembly.

Like characters of reference indicate like parts throughout the several views in the drawings.

A pair of end supports, each identical in structure, are made such as by casting or by building up from individual members, such as is herein shown wherein structural forms are employed. In the present showing, a pair of channel irons 10 and 11 are positioned one along the other with their webs outermost and interconnected by plates 12 and 13 welded thereto on the top sides at their end portions. In order to provide a wider effective base area, these channel irons 10 and 11 are spaced apart, as indicated in Fig. 1.

Welded to the top faces of these plates 12 and 13 respectively are angle irons 14 and 15 symmetrically inclined toward the center line through the base channel irons 10 and 11. The upper ends of these angle irons 14 and 15 are interconnected and tied together by a vertically disposed plate 16, the plate 16 being brought against the outer faces of corresponding legs of the angle irons 14 and 15 and welded thereto. The plate 16 is provided with a slot 17 entering from the top edge of the plate, centrally thereof, and terminating with a lower semicircular end, this end serving as a bearing as will hereinafter be explained. Across the lower part of this plate 16 and between the upper ends of the angle irons 14 and 15 is a horizontally disposed slot 18, spaced below the vertically disposed slot 17. As above indicated, both supports are identically constructed, but for reference, one support will be generally designated by the numeral 19 and the other by the numeral 20.

In order to space apart these supports 19 and 20 the required distance, and to hold them rigidly in upright positions, a pair of metal tubes 21 and 22 have their respective ends inserted through axially aligned holes provided near both the outer ends of the channel irons 10, 11 as indicated in Figs. 1 and 3. One or both of the supports 19 and 20 may be shifted along the tubes 21 and 22 to give the desired spacing therebetween. The supports 19 and 20 are rigidly fixed in position with the desired spacing by passing U-bolts 23 upwardly around the tubes 21 and 22 between the channel irons 10 and 11 and through holes provided in the plates 12 and 13 to be screw-threadedly engaged by their ends with nuts 24 as means for pulling the bolts upwardly snugly against the tubes and thereby clamping them rigidly with the channel irons 10 and 11. The spacing apart of the webs of the channel irons 10 and 11 along the tubes 21 and 22, one web on each side of the intervening bolt 23, adequately serves to prevent any tendency of the support to rock in respect to the interconnecting tubes 21 and 22. This construction gives a very rigid positioning and maintenance of the supports 19 and 20.

An unique bracket assembly is provided to engage with the engine to be carried by the stand.

Due to military restrictions, the engine is not here shown but suffice it to say that the engine is supported normally in the tank in which it is used to have its axis disposed horizontally, and in mounting the engine in this position, there are end pads on a carrying member which correspond in shape and size to the pad 25, as shown in the drawings herein, on the arm bracket assembly. Furthermore, this particular type of engine in question employs a steady bar to assist in holding the engine in the position indicated. This steady bar is a tubular member open at both ends.

With that much structure of the particular engine in mind, reference is now made to the arm bracket assembly which enters into the present invention. In this assembly is a main vertically disposed arm bracket 26 consisting essentially of a metal plate of sufficient thickness to prevent tendency to bend from its flat condition. At one end of this bracket 26 is mounted the pad 25 spaced inwardly from the face of the bracket by any suitable means, such as by a length of metal pipe or tubing 27, the parts being interconnected in any suitable manner, such as by welding. On the other side of the bracket 26 is positioned a short shaft or trunnion 28, to extend from the opposite side of the bracket. The horizontal axes of the pad 25 and trunnion 28 are substantially at the same distances from the top edge of the bracket 26. This trunnion 28, in the form herein shown, is fixed to the bracket 26 by having a reduced diameter portion extending on through the bracket 26 to be welded thereto on the opposite side. The trunnion 28 is further provided with an annularly extending flange 29 on its outer free end, Fig. 5, to leave a cylindrical bearing surface between the flange 29 and the bracket 26.

A steady bar 30, herein shown as being tubular, has one end abutted against the inner face of the bracket 26 joined near the lower right-hand corner thereof as viewed in Fig. 4, the axis of this bar 30 being parallel to the axis of the trunnion 28 and perpendicular to the face of the pad 25. As indicated in Fig. 4, the axis of this bar 30 is spaced below the axes of the pad 25 and the trunnion 28. The bracket 26 is tapered from a wide end, at which is located the steady bar 30, to a narrow end at which is located the pad 25 through its extension 27, Fig. 4. A gusset plate 31 is welded on the top side of the bar 30 and against the bracket 26, Fig. 6, to reinforce the bar 30 and to prevent bending of the bar from its perpendicular alignment with the face of the bracket 26. The bar 30, in the present form, is formed to have its outer end of that diameter which will engage with a sliding fit into the steady bar carried by the engine, the remainder of the bar being preferably enlarged in diameter to resist tendency to bend.

Two of these arm bracket assemblies, as above described, are required, and for sake of convenience are generally designated by the numerals 32 and 33. The assembly 32 is secured to one side of the engine by inserting its steady bar 30 into the steady bar socket of the engine and the pad 25 is brought up against the corresponding mounting pad of the engine and there secured by bolts (not shown) entered through the holes 34 (Fig. 4) so that the assembly is firmly attached to the engine on the one side. In the same manner the other arm bracket assembly 33 is secured to the opposite side of the engine.

With the two arm bracket assemblies 32 and 33 thus attached to the engine, the engine is lowered between the supports 19 and 20 to have the respective trunnions 28 of the arm bracket assemblies entered into the slots 17 provided, as above described, in the supports 19 and 20. The trunnions come to rest at the lower ends of these slots 17 so that the engine is then supported through the arm bracket assemblies directly upon the supports 19 and 20. The arm bracket assemblies 32 and 33 are each provided with one or more holes 35 through the arm brackets 26, Fig. 4, herein shown as two in number, to come into alignment upon rocking of the arm bracket assemblies with one or more holes 36 provided in the plate 16. The locations of these holes 35 and of the hole 36 are selected in accordance with the degree of rotation of the engine desired, and the position of that rotation is maintained by inserting a pin 37 through the hole 36 into the particular hole 35 registered therebehind. In the form herein shown, Fig. 3, two holes 36 are employed, a pin 37 being positioned in that hole 36 of the plate 16 and the hole 35 in the arm bracket 26 to hold the arm bracket assemblies in their horizontally disposed positions, Fig. 3, wherein the axis of the engine is horizontally disposed. When the engine is to be rocked to some such position as will carry the arm bracket assemblies around to an inclined position as indicated by dash lines in Fig. 3, the second hole 35 in the arm bracket 26 will register with the hole 36 to permit the pin being interengaged accordingly to maintain that rocked position.

In these particular types of tank radial engines, the horizontally disposed cylinders have push rods normally positioned behind the arm brackets 26. In order to permit the removal of these push rods, the arm bracket 26 is provided with an opening 38 therethrough, Fig. 4, and the slot 18 in the plate 16 is so located that when the engine is revolved to have the arm bracket assemblies come to the dash line position, Fig. 3, the openings 38 will be exposed through the slot 18, as indicated in Fig. 3, so that the push rods may be withdrawn in reference to those horizontal cylinders. For convenience, the pin 37 is attached to the outer end of the trunnion 28 by any flexible connection, such as a chain 39, Fig. 3.

Thus it is to be seen that an engine stand is provided which permits free revolution of the engine between end supports without interference from any interconnecting bars or the like, and that has an exceedingly small number of parts in its assembly. Furthermore, the stand permits access to any and all of the various parts of the engine even including the members that would normally be covered over by the arm assembly brackets or the upper ends of the end supports.

While the invention has been herein shown and described in the one particular form, it is obvious that structural changes may be employed, such for example as in the particular formation of the end supports and in the manner of interconnecting the various elements of the arm bracket assemblies, without departing from the spirit of the invention and it is therefore not desired that the invention be limited to that precise form beyond the limitations as may be imposed by the following claim.

I claim:

An engine stand comprising a pair of supports the upper end of each of which carries a bearing member having an inner vertically disposed planar surface and is provided with a notch entering from above to provide a bearing seat, and right and left hand engine bracket assemblies each comprising a bearing member for slidably abutting respectively one of said planar surfaces, a trunnion extending from the outer side of each of said members shaped to enter said notches from above and rotate therein, an engine attaching pad mounted on each of said members opposing one another, and a steady bar carried by each of said members to extend inwardly therefrom in axial alignment one bar with the other, and means carried by said trunnions for holding them against axial displacement across said notches whereby said brackets can be individually applied to an engine and the combined engine and bracket unit may be lowered onto the supports with trunnions entering the notched bearings.

JOSEPH H. STALEY.